UNITED STATES PATENT OFFICE.

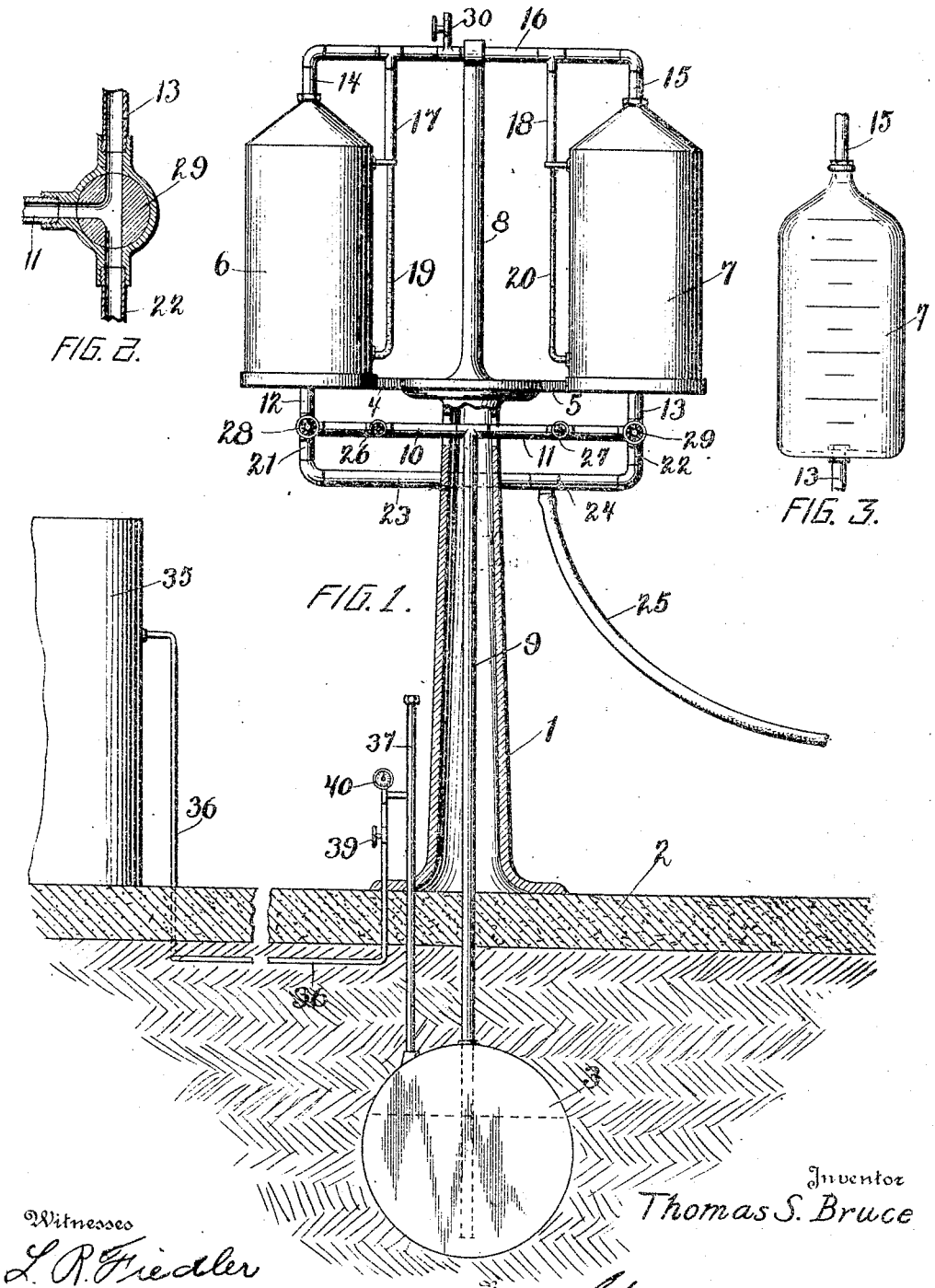

THOMAS S. BRUCE, OF DALLAS, TEXAS.

DEVICE FOR DISPENSING LIQUIDS.

1,218,925.  Specification of Letters Patent.  Patented Mar. 13, 1917.

Application filed October 21, 1915. Serial No. 57,123.

*To all whom it may concern:*

Be it known that I, THOMAS S. BRUCE, a citizen of the United States, residing at Dallas, in the county of Dallas, State of Texas, have invented certain new and useful Improvements in Devices for Dispensing Liquids, of which the following is a description, reference being had to the accompanying drawings, forming a part hereof.

My invention relates to devices for dispensing liquids in measured quantities and relates particularly to devices for serving or dispensing gasolene or like liquid from a storage reservoir to automobiles and other vehicles.

My invention has for its object to provide a device of this character which will be inexpensive in construction, which will deliver the liquid without pumping it, will plainly show the amount to be delivered and will deliver it directly into the tank of the automobile or other vehicle.

With these and other objects hereinafter described in view, my invention consists in the construction and combination of elements hereinafter described and claimed.

Referring to the drawings,

Figure 1 is an elevation partly in section showing a complete device embodying my invention.

Fig. 2 is a detail sectional view of one of the three-way valves, and,

Fig. 3 is a detail view of a modified form of measuring vessel.

In the drawings, 1 indicates a standard resting on the sidewalk or pavement 2 and 3 indicates a storage tank in the ground preferably directly below the standard 1. The standard 1 is preferably hollow as shown. At its upper end, the standard is provided with oppositely extending arms or brackets 4 and 5 carrying, respectively, measuring vessels 6 and 7.

On the upper end of the standard 1 is an extension 8 having its upper end somewhat above the upper ends of the measuring vessels 6 and 7.

Extending upward from the storage tank 3 through the interior of the standard 1 is a pipe 9 having at its upper end branches 10 and 11 extending outward below the arms or brackets, and to the ends of these branches are connected, respectively, pipes 12 and 13 leading through the arms or brackets 4 and 5 into the measuring vessels 6 and 7. From the upper ends of the measuring vessels 6 and 7 lead pipes 14 and 15 which connect at their upper ends with horizontal pipe 16 which is supported in the upper end of the extension 8. To the horizontal pipe 16 at points on each side of the standard 8 near the measuring vessels 6 and 7 are connected depending pipes 17 and 18. To the lower end of the pipe 17 is connected a gage glass 19 and to the lower end of the pipe 18 is connected a gage glass 20, these gage glasses being connected in the usual way at their upper and lower ends to the respective measuring vessels 6 and 7.

From the points at which the pipes 12 and 13 join the pipes 10 and 11 lead pipes 21 and 22 which are both connected to delivery pipe 23 to which is connected at 24 delivery hose 25.

The pipes 10 and 11 are provided, respectively, with shut-off valves 26 and 27. At the junction of pipes 10, 12 and 21 is located a three-way cock 28 and at the junction of pipes 11, 13 and 22 is located a three-way cock 29. In the pipe 16 is located an air outlet cock 30.

In use the gasolene or other liquid to be dispensed is forced up the pipe 9 and through pipe 10 or 11, as may be determined by opening or closing the valves 26 and 27 and the positions to which three-way cocks 28 and 29 are turned into measuring vessel 6 or 7. In beginning use of the device, it will be necessary to open the air outlet cock 30 to permit the air in the measuring vessel which is to be filled, to escape. As soon as the measuring vessel selected is filled to the extent desired, which is shown by the gage glass, the valve 26 or 27 which was opened, is closed and the three-way cock 28 or 29 corresponding to it is turned to connect pipe 12 or 13, as the case may be, with pipe 21 or 22 so that the contents of the measuring vessel may flow out into pipe 23 and through it into delivery hose 25. At the same time, the valve 27 or 26 not previously opened, should be opened and the corresponding three-way cock turned to connect the pipe 11 or 10 with the pipe 13 or 12, and the air outlet cock 30 should be closed. This puts the measuring vessel not previously filled in communication with the pipe 9 from the storage tank and puts its upper end in communication with the measuring vessel previously filled. By this arrangement, as the measuring vessel previously filled delivers its contents through hose 25, the other measuring vessel is being filled, the air contained in the measuring vessel being filled, passing over through the pipe 16 to the measuring vessel from which the contents are being drawn forcing its contents out at the same rate at which the other measuring vessel is being filled.

The air which thus in operation passes from one measuring vessel to the other and necessarily becomes more or less loaded with gasolene vapor and is likely to be explosive, is kept from escaping so long as the air outlet cock 30 is closed.

By turning the valves 26 and 27 and the three-way cocks 28 and 29, the measuring vessels 6 and 7 may be alternately filled and discharged so long as the gasolene is forced upward from the storage tank and by suitable manipulation of the valves and three-way cocks, a practically continuous flow of gasolene through the delivery hose 25 may be secured. With sufficient pressure on the storage tank, the gasolene may be delivered, if desired, through hose 25 at a point above the level of the measuring vessels.

This pressure delivery, which is often convenient when the tank to be filled is above the level of the dispensing apparatus, may be accomplished either directly from the storage receptacle or through the measuring vessels. In the former instance, it will be apparent that if either of the valves 26 or 27 be open and 28 or 29 turned to close admittance to the measuring vessels, the liquid under the air pressure can flow through the supply pipe and delivery pipe without being measured. If under these pressure conditions it be desired to measure such liquid, one of the measuring receptacles may be partially filled by a proper operation of the valves described and one of the valves then closed and liquid admitted to the opposite vessel which in rising under the air pressure will compress the air in the upper portion of the first mentioned vessel, thus producing sufficient pressure to properly expel the liquid from the vessel in which it is measured. The construction and arrangement of the supply and delivery pipes with their valved connections permit the use of either of the measuring vessels if for any reason one should not be in condition for use and also permit the alternate filling of these vessels, as before stated. Furthermore, these connections permit the vessels to be completely disconnected from the supply pipe and liquid conducted directly from the supply tank to the delivery pipe.

The air pressure necessary to force gasolene from the storage tank to the measuring vessels may be produced in any convenient manner. The device is particularly adapted for use in connection with a garage or automobile supply station which is usually provided with means for supplying air under pressure such as an air tank 35 in which the air is forced by a suitable air pump (not shown). When such an air tank is available, it may be connected by pipe 36 to the filling tube 37 of the storage tank 2, this filling tube being provided at its upper end with a plug or cap 38 for closing it. A valve 39 in the pipe 36 controls the admission of air and a gage 40 in the same pipe indicates the pressure on the storage tank.

The measuring vessels 6 and 7 may conveniently be ordinary cans, preferably of a capacity of five or more gallons each. They may if desired be of glass, as indicated in Fig. 3 in which case the gage glasses 19 and 20 may be dispensed with, a gage being marked on the tanks.

Having thus described my invention, what I claim is:—

1. In a liquid dispensing device, the combination of a storage tank, a plurality of measuring vessels, a supply pipe leading from said tank to said vessels, a delivery pipe connected to said vessels, means for forcing liquid from said storage tank into said supply pipe, valve connections for supplying liquid and delivering from each of said vessels and means connecting said measuring vessels whereby the pressure established through the flow of liquid into one vessel will deliver the measured liquid at a point above the normal gravity delivery therefrom.

2. In a liquid dispensing device, the combination of a storage tank, a plurality of measuring vessels, a supply pipe leading from said tank to said vessels, a delivery pipe connected to said vessels, means for forcing liquid from said storage tank into said supply pipe, an air pipe connecting the upper ends of said measuring vessels, and valves arranged to independently control the supply and delivery pipe connections therefrom whereby a pressure may be maintained in one of said vessels, to deliver pressure through said air pipe to deliver liquid from another measuring vessel connected therewith.

3. In a liquid dispensing device, the combination of a storage tank, a plurality of measuring vessels, a supply pipe leading from said tank to said vessels, a delivery pipe connected to said vessels, means for forcing liquid from said storage tank into said supply pipe, an air pipe connecting the upper ends of the measuring vessels, valves in said supply pipe to independently control the supply to each vessel, and cocks disposed at the junction of the supply and delivery pipes to permit passage of liquid either from said vessels or from said supply pipe.

4. In a liquid dispensing device, the combination of a storage tank, a plurality of measuring vessels, each having an inlet pipe near its bottom, a supply pipe leading from the storage tank provided with branches, and a delivery pipe, the inlet pipe for each measuring vessel, a branch of the supply pipe and the delivery pipe being arranged to meet at a common point, an air pipe connecting the upper ends of the measuring vessels, means for forcing liquid from the storage tank into the supply pipe, and three-way valves at the junctions of the branch supply pipes, inlet pipes and delivery pipe.

5. In a liquid dispensing device, the combination of a storage tank, a standard disposed above the same and provided with lateral brackets, measuring vessels mounted upon said brackets, a supply pipe extending upward through the standard from said tank to said vessels, a delivery pipe connected to said supply pipe, cocks disposed at the intersection of the supply and delivery pipes, and means for creating a pressure in said tank to force liquid through said supply pipe.

6. In a liquid dispensing device, the combination of a storage tank, a standard disposed above the same and provided with lateral brackets, measuring vessels mounted upon said brackets, a supply pipe extending upward through the standard from said tank to said vessels, a delivery pipe connected to said supply pipe, cocks disposed at the intersection of the supply and delivery pipes, an extension from said standard, an air pipe mounted in said extension and connecting the upper ends of said vessels, and an outlet cock disposed in said air pipe to permit escape of pressure therefrom when desired.

7. In a liquid dispensing device, the combination of a storage tank, a plurality of measuring vessels, means for supplying said vessels from said tank, means for delivering from said vessels, an air pipe connecting the upper ends of said vessels above the liquid level therein, an indicating gage connected to the sides of said vessels, a pipe connection from said air pipe with the upper end of said gages, and means for forcing liquid from said tank to said receptacle.

This specification signed and witnessed this 18th day of Oct. A. D. 1915.

THOMAS S. BRUCE.

In the presence of—
E. W. FOSTER,
J. L. CHANDLER.